(12) United States Patent
Fuchs et al.

(10) Patent No.: US 7,246,815 B2
(45) Date of Patent: Jul. 24, 2007

(54) AIRBAG UNIT

(75) Inventors: Stefan Fuchs, Goldbach (DE); Ralf Bartholomaus, Goldbach (DE)

(73) Assignee: Takata-Petri AG, Aschaffenburg (DE)

( * ) Notice: Subject to any disclaimer, the term of this patent is extended or adjusted under 35 U.S.C. 154(b) by 79 days.

(21) Appl. No.: 10/644,956

(22) Filed: Aug. 21, 2003

(65) Prior Publication Data

US 2004/0100072 A1 May 27, 2004

(30) Foreign Application Priority Data

Sep. 4, 2002 (DE) ................. 102 41 622

(51) Int. Cl.
*B60R 21/20* (2006.01)
*B60R 21/16* (2006.01)

(52) U.S. Cl. ................... 280/728.2; 280/731

(58) Field of Classification Search ............ 280/728.2, 280/736, 731
See application file for complete search history.

(56) References Cited

U.S. PATENT DOCUMENTS

| 3,632,135 A | 1/1972 | Chute et al. |
| 4,943,027 A | 7/1990 | Nakayama |
| 5,542,693 A | 8/1996 | Koide |
| 5,730,459 A | 3/1998 | Kanda |
| 5,813,692 A * | 9/1998 | Faigle et al. ............. 280/728.2 |
| 5,826,901 A | 10/1998 | Adomeit |
| 6,095,549 A | 8/2000 | Adomeit et al. |
| 6,286,858 B1 * | 9/2001 | Shepherd et al. ........ 280/728.2 |

FOREIGN PATENT DOCUMENTS

| DE | 44 30 588 C2 | 10/1995 |
| DE | 44 38 693 A1 | 5/1996 |
| DE | 197 20 149 C2 | 11/1998 |
| DE | 297 24 483 U1 | 8/2001 |
| JP | 49-13168 | 3/1974 |
| JP | 4-135944 | 5/1992 |
| JP | 6-206509 | 7/1994 |
| JP | 7-251697 | 10/1995 |
| JP | 2001-50691 A | 5/2001 |

* cited by examiner

*Primary Examiner*—Ruth Ilan
(74) *Attorney, Agent, or Firm*—Foley & Lardner LLP

(57) ABSTRACT

An airbag unit for motor vehicles, with a tubular gas generator, tied to a motor vehicle structure, for generating a filling gas for a gas bag. The tubular gas generator is displaceable in the direction of its tube axis in relation to the motor vehicle structure and being in interaction with a deformation element which, under the action of a force which is greater than or equal to a defined minimum force, is deformed and makes it possible for the tubular gas generator to be displaced along its tube axis.

16 Claims, 1 Drawing Sheet

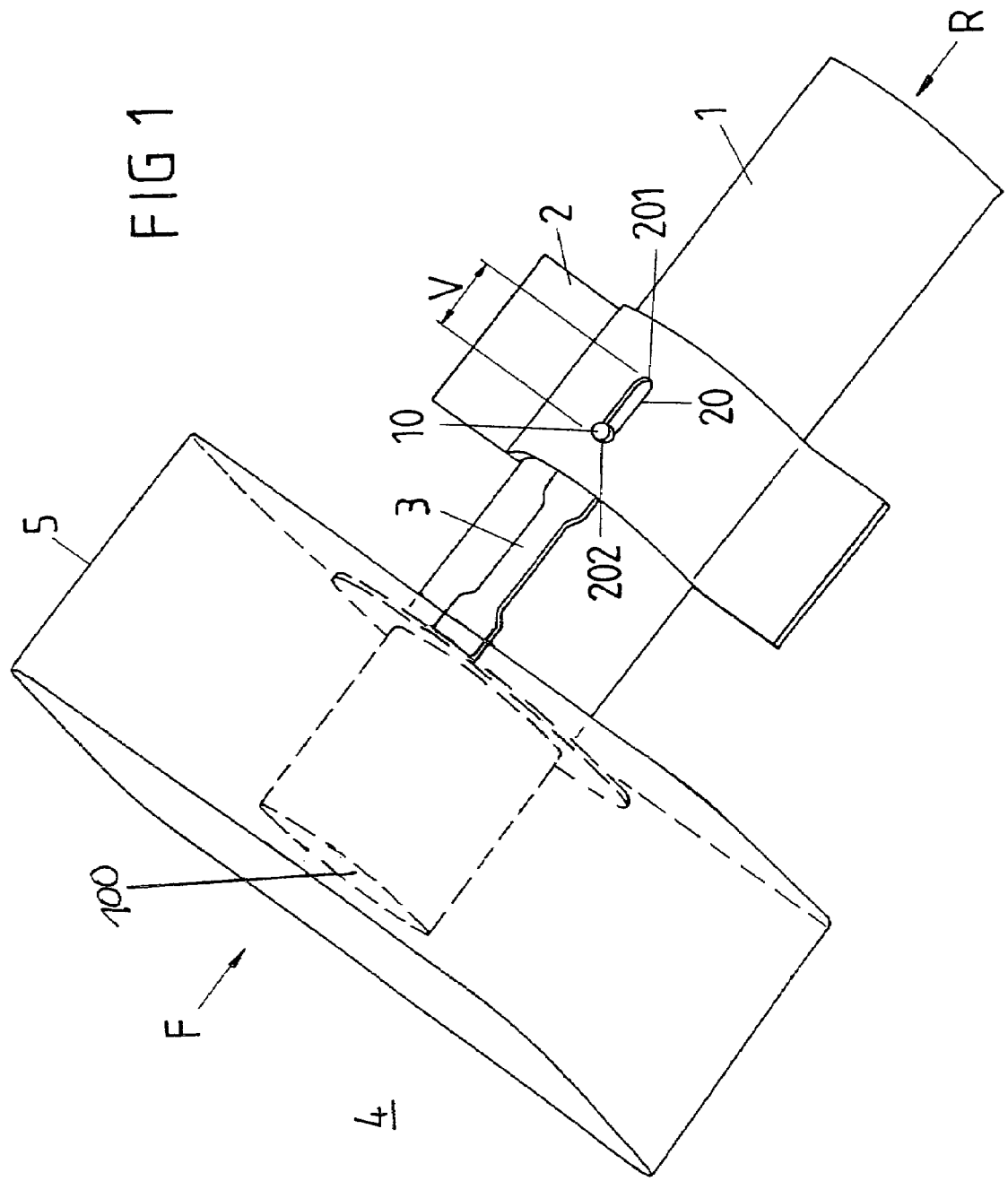

AIRBAG UNIT

BACKGROUND OF THE INVENTION

The invention relates to an airbag unit for a motor vehicle.

Airbag units are used in motor vehicles in order to increase passive safety and to improve vehicle occupant protection. The airbag units generally have, in this context, a gas bag and a gas generator for filling the gas bag with a filling gas. For use in airbag units, different types of gas generators are known, in particular also tubular gas generators, in which the gas generator housing has a tubular design. These tubular gas generators have the advantage that they are of very slender design and therefore have a small construction dimension in the tube cross-section direction. In the case of a stationary installation of the tubular gas generator, in which the tube axis points in the direction of the vehicle interior, a particularly favourable installation dimension is achieved in the otherwise limited surface of the dashboard.

There is the problem, in the case of a stationary installation of a tubular gas generator, that the tubular gas generator itself entails a risk of injury, since it is a projecting part fixed to the vehicle. For parts of this kind which are fixed to the vehicle and are adjacent to the vehicle interior, there are legally prescribed limit values for the acceleration which may be exerted by the parts, for example in the event of a head-on impact, on the head. Parts arranged in the dashboard region must therefore have a defined deformation behaviour, so that these limit values can be fulfilled. However, because of their function of generating a pressure gas, tubular gas generators are not deformable to the necessary extent.

SUMMARY OF THE INVENTION

An object of the present invention is to specify an airbag unit for motor vehicles, with a tubular gas generator, the said airbag unit reducing the risk of injury to a motor vehicle occupant in the event of an impact.

The airbag unit for motor vehicles has a tubular gas generator, tied to a motor vehicle structure, for generating a filling gas for a gas bag. According to and embodiment of the present invention, the tubular gas generator is displaceable in the direction of its tube axis in relation to the motor vehicle structure and is in interaction with a deformation element which, under the action of a force which is greater than or equal to a defined minimum force, is deformed and makes it possible for the tubular gas generator to be displaced along its tube axis. A fastening element may be provided for the simple tying of the tubular generator to the motor vehicle structure.

For guiding the tubular gas generator along a defined and, in particular, limited displacement travel, in one version of the invention guide members which are in engagement with one another are provided. The guide members may in this case be arranged in such a way that a first guide member is arranged on the fastening element and a second guide member which is engagement with the first guide member is arranged on the tubular gas generator.

In order to make it possible for the impact energy to be introduced into the deformation element as efficiently as possible, at least one of the guide members extends essentially in the direction of the tube axis of the installed tubular gas generator. In a cost-effective embodiment of the invention, the first guide member is designed as a long hole and the second guide member as a pin engaging into the long hole. Both the pin and the long hole can be formed in a simple way on the tubular gas generator or on the fastening element.

For a further reduction in the risk of injury on projecting parts of the tubular gas generator, in one embodiment of the invention the displacement travel defined by the guide members points essentially away from a vehicle occupant located in the vehicle interior.

The deformation element serves, inter alia, for allowing a displacement of the tubular gas generator with respect to the fastening element only from the moment when a defined minimum force takes action. The deformation element may therefore be arranged in such a way that a displacement of the tubular gas generator under the action of a force in the displacement direction which is lower than a defined minimum force is prevented. This prevents the tubular gas generator from being displaced when the motor vehicle is operating normally. The actual protective action therefore takes effect only when a force exceeding a defined limit value acts on the tubular gas generator.

Since in a development of the invention, for example, the gas bag is supported at least partially on the tubular gas generator, the displacement travel of the tubular gas generator must be limited in such a way that the supporting force acting on the gas bag can also be transmitted from the motor vehicle structure to the tubular gas generator. The first and/or the second guide member therefore has at least one stop for limiting the displacement travel of the tubular gas generator in at least one displacement direction. If two stops are provided, the deformation element may be arranged in such a way that the tubular gas generator is braced in its position of rest between one of the stops and the fastening element. The second stop then serves for limiting the displacement of the tubular gas generator in the event of an impact.

The air bag unit according to the invention affords particularly good impact protection when the tube axis of the installed tubular gas generator points essentially in the direction of the motor vehicle interior, since, in the event of an impact, the forces are then introduced essentially along the tube axis of the tubular gas generator. A "stationary installation" of the tubular gas generator in the motor vehicle is also referred to here. In a development of the invention, the tubular gas generator carries a housing for receiving further components of the airbag unit, in particular a diffuser and/or a gas bag. A compact airbag unit, into which a large number of components are integrated, can thereby be produced.

BRIEF DESCRIPTION OF THE DRAWINGS

The invention is explained below by means of the drawing of the single FIGURE in which:

FIG. 1 shows an airbag unit according to the invention for motor vehicles, with a tubular gas generator and with a fastening element for tying the tubular gas generator to the motor vehicle structure.

DETAILED DESCRIPTION

According to an embodiment of the present invention, an airbag unit for motor vehicles with a tubular gas generator is provided. The unit includes at least one fastening element for tying the tubular gas generator to the motor vehicle structure has a guide mechanism for guiding the displacement movement of the tubular gas generator in relation to the fastening element, and, furthermore, there is arranged between the tubular gas generator and the fastening element a deformation element which, under the action of a force which is equal to or greater than a defined minimum force, is deformed and makes it possible for the tubular gas generator to be displaced in the displacement direction.

An airbag unit according to the invention is shown in FIG. 1. The airbag unit comprises a tubular gas generator 1 which is fastened to the vehicle structure in a fastening element 2 which is designed here as a fastening clip or fastening sleeve. The tubular gas generator 1 carries, at one end 100 facing a motor vehicle interior 4, a housing 5 which receives, for example, a gas bag, not illustrated here. Furthermore, a diffuser, likewise not illustrated here, for the uniform distribution of the gas flowing out of the tubular gas generator 1 into the gas bag may be provided in the housing 5.

The tubular gas generator 1 is arranged displaceably in the direction of its tube axis R in the fastening element 2. This may be achieved, for example, in that the outside diameter of the tubular gas generator 1 has a smaller diameter than the inside diameter of the fastening element 2. Formed on the tubular gas generator 1 is a pin 10 which engages into a long hole 20 introduced into the fastening element 2. The long hole 20 of the fastening element 2 has an upper stop 202 and a lower stop 201 which limit the possible displacement travel V of the tubular gas generator 1. The tubular gas generator can therefore be displaced between the two stops 201, 202 by the amount of a displacement travel V on the path predetermined by the long hole 20.

Furthermore, a deformation element 3 is arranged between the fastening element 2 and the tubular gas generator 1. In the embodiment shown, the deformation element 3 braces the tubular gas generator 1 with respect to the fastening element 2 in such a way that the pin 10 formed on the tubular gas generator 1 comes to bear with a form fit against the upper stop 202 of the long hole 20. Consequently, the tubular gas generator 1 is blocked by the stop 202 of the long hole 20 in one displacement direction along its tube axis R and is blocked by the deformation element 3 in the other displacement direction.

The airbag unit shown in FIG. 1 is installed in a motor vehicle in such a way that that side of the tubular gas generator 1 which carries the housing 5 points in the direction of the motor vehicle interior 4. The housing 5 and also the corresponding end face 100 of the tubular gas generator 1 consequently face a motor vehicle occupant located in the motor vehicle interior 4.

In the event of an accident, high acceleration forces act on the motor vehicle occupant. In an unfavourable situation, the head of the motor vehicle occupant does not strike a deployed gas bag, but, instead, the housing 5 or the end face 100 of the gas generator 1. In this case, a force F is exerted on the tubular gas generator 1 in the direction of the tube axis R of the tubular gas generator 1. This force F exerted on the end face 100 of the tubular gas generator 1 deforms the deformation element 3 arranged between the tubular gas generator 1 and the fastening element 2 when the force exceeds a defined minimum force. This minimum force is in this case defined, for example, by legal prescriptions. The energy introduced into the tubular gas generator 1 by the motor vehicle occupant's body part striking the tubular gas generator is converted partially into deformation energy in the deformation element 3. Under the action of the force F, the tubular gas generator 1 is therefore displaced in the direction of its tube axis R, until the pin 10 in the long hole 20 butts with a form fit against the lower stop 201. The risk of injury to the motor vehicle occupant on the projecting parts of the tubular gas generator 1 is thus reduced, since the maximum accelerations which occur are diminished as a result of the conversion of kinetic impact energy into deformation energy.

The invention is not restricted to the exemplary embodiment described above.

Germany Patent Application 102 41 622.2, filed Sep. 4, 2002 including the specification, drawings, claims and abstract, is incorporated herein by reference in its entirety.

What is claimed is:
1. An airbag unit for a motor vehicle comprising:
a tubular gas generator for generating a filling gas for an airbag, the gas generator having a tube axis;
a fastening element for tying the gas generator to the motor vehicle;
a deformation element which is configured to interact with the gas generator and deform to allow the tubular gas generator to be displaced relative to the motor vehicle in the direction of the tube axis; and
a first guide member arranged on the fastening element and a second guide member located on the tubular gas generator and engaged with the first guide member, and wherein the first guide member extends essentially in the direction of the tube axis of the tubular gas generator and the second guide member extends essentially in a direction away from the tube axis of the tubular gas generator.
2. The airbag unit of claim 1, wherein the guide members are configured to guide the tubular gas generator along a defined displacement path, wherein the guide members are engaged.
3. The airbag unit of claim 2, wherein the displacement path formed by the guide members points essentially away from a vehicle occupant located in the vehicle interior.
4. The airbag unit of claim 1, wherein the gas generator is positioned so that the tube axis points essentially in the direction of the motor vehicle interior.
5. The airbag unit of claim 1, wherein the first guide member has at least one stop for limiting the displacement travel of the tubular gas generator in at least one direction.
6. The airbag unit of claim 1, wherein the deformation element is arranged so that a displacement of the tubular gas generator is prevented when the gas generator is subjected to a force, in the direction of the tube axis, which is lower than a predetermined force.
7. The airbag unit of claim 1, further comprising:
a housing for receiving further components of the airbag unit, wherein the housing is arranged on the tubular gas generator.
8. The airbag unit of claim 7, wherein the housing houses at least one of a diffuser and a gas bag.
9. An airbag unit for a motor vehicle comprising:
a tubular gas generator for generating a filling gas for an airbag, the gas generator having a tube axis:
a fastening element for tying the gas generator to the motor vehicle;
a deformation element which is configured to interact with the gas generator and deform to allow the tubular gas generator to be displaced relative to the motor vehicle in the direction of the tube axis; and
a first guide member comprising a long hole in the fastening element and a second guide member located on the tubular gas generator and comprising a pin engaging into the long hole.
10. The airbag unit of claim 9, wherein the guide members are configured to guide the tubular gas generator along a defined displacement path.

11. The airbag unit of claim 10, wherein the displacement path formed by the guide members points essentially away from a vehicle occupant located in the vehicle interior.

12. The airbag unit of claim 9, wherein the first guide member has a stop for limiting the displacement travel of the gas generator.

13. The airbag unit of claim 9, wherein the deformation element is arranged in such a way that a displacement of the tubular gas generator is prevented when the gas generator is subjected to a force in the direction of the tube axis which is lower than a predetermined force.

14. The airbag unit of claim 9, further comprising a housing for receiving further components of the airbag unit, wherein the housing is arranged on the tubular gas generator.

15. The airbag unit of claim 14, wherein the housing houses at least one of a diffuser and a gas bag.

16. The airbag unit of claim 9, wherein the gas generator is positioned so that the tube axis points essentially in the direction of the motor vehicle interior.

* * * * *